(12) United States Patent
Hoskinson et al.

(10) Patent No.: US 7,311,013 B1
(45) Date of Patent: Dec. 25, 2007

(54) COMPLEX PENDULUM BIOMASS SENSOR

(75) Inventors: Reed L. Hoskinson, Rigby, ID (US); Kevin L. Kenney, Idaho Falls, ID (US); Ben C. Perrenoud, Rigby, ID (US)

(73) Assignee: U.S. Department of Energy, Washington, DC (US)

( * ) Notice: Subject to any disclaimer, the term of this patent is extended or adjusted under 35 U.S.C. 154(b) by 0 days.

(21) Appl. No.: 11/537,007

(22) Filed: Sep. 29, 2006

(51) Int. Cl.
*A01D 75/28* (2006.01)

(52) U.S. Cl. .................... 73/865.8; 56/10.2 E
(58) Field of Classification Search ............... 73/865.8; 56/10.2 E
See application file for complete search history.

(56) References Cited

U.S. PATENT DOCUMENTS

| | | | | |
|---|---|---|---|---|
| 4,875,889 A | * | 10/1989 | Hagerer et al. | 460/1 |
| 6,068,059 A | * | 5/2000 | Bajema et al. | 171/130 |
| 6,185,990 B1 | * | 2/2001 | Missotten et al. | 73/73 |
| 6,986,294 B2 | * | 1/2006 | Fromme et al. | 73/865.8 |
| 2003/0066277 A1 | * | 4/2003 | Behnke | 56/10.2 R |
| 2006/0026939 A1 | * | 2/2006 | Kormann | 56/10.2 E |

* cited by examiner

*Primary Examiner*—Robert Raevis
(74) *Attorney, Agent, or Firm*—Michael J. Dobbs; Daniel D. Park; Paul A. Gottlieb

(57) ABSTRACT

A complex pendulum system biomass sensor having a plurality of pendulums. The plurality of pendulums allow the system to detect a biomass height and density. Each pendulum has an angular deflection sensor and a deflector at a unique height. The pendulums are passed through the biomass and readings from the angular deflection sensors are fed into a control system. The control system determines whether adjustment of machine settings is appropriate and either displays an output to the operator, or adjusts automatically adjusts the machine settings, such as the speed, at which the pendulums are passed through the biomass. In an alternate embodiment, an entanglement sensor is also passed through the biomass to determine the amount of biomass entanglement. This measure of entanglement is also fed into the control system.

24 Claims, 4 Drawing Sheets

COMPLEX PENDULUM BIOMASS SENSOR

GOVERNMENT INTERESTS

The United States Government has rights in this invention pursuant to Contract No. DE-AC07-99ID13727, between the U.S. Department of Energy (DOE) and Bechtel BWXT Idaho LLC.

FIELD OF THE INVENTION

The present invention relates to agricultural harvesting equipment. More particularly, the present invention relates to increasing the efficiency of biomass harvesters by the determination of height, density and entanglement of biomass entering a combine harvester. The present invention allows for the real time detection of biomass height, density and entanglement of a various biomass including grain, corn, forage crops, and switch grass.

BACKGROUND OF THE INVENTION

Combine harvesters have been used to efficiently harvest biomass for many years. Originally developed to eliminate the need for manual cutting and threshing, harvesters have evolved into large self-powered machines, able to simultaneously perform many steps at once. A modern combine harvester can now cut, thresh, and clean crop in one continuous operation.

Combine harvesters today provide the operator with a means to vary machine settings so that different crop conditions may be accommodated. In order to achieve the highest capacity and efficiency of the harvesting machine, the harvester ground speed must be controlled according to the varying conditions of crop height, density and entanglement. This control is normally achieved by an operator, who depending on his or her experience, visually judges the crop condition and adjusts the ground speed accordingly. However, crop conditions can vary widely in the same field, requiring the operator to make constant adjustments to ground speed in order to attempt to maintain the optimum machine capacity and efficiency. This constant adjustment by the operator is not only a burden on the operator, but makes it very difficult to maintain an optimal speed for a given crop condition. Furthermore, constant adjustments may pose a safety risk by drawing the operators attention away from the safe operation of the combine harvester.

One method of measuring the efficiency of a combine harvester harvesting grain is to measure the amount of grain lost over the back of the sieve component and over the straw walker assembly such as described in U.S. Pat. No. 4,036,065 herein fully incorporated by reference. U.S. Pat. No. 4,036,065 describes the use of sensors at locations across the rear of the sieve of a combine and the sound of grain kernels striking the sensor being picked up by a microphone, amplified, filtered and fed to a ratio computing device which calculates the total grain loss from the sampling. The calculated grain loss is then displayed to the operator who can then make the necessary adjustments. Similarly, U.S. Pat. No. 5,015,997, herein fully incorporated by reference, describes a method of measuring grain loss over the back of the sieve using a pulse pick-up or vibration pick-up type sensor. Other systems utilize piezoelectric transducers to detect grain loss over the back of the sieve component.

These prior art systems can account in some degree for the various factors of affecting the harvesting of the crop. Such devices, however, insufficient for determining the optimum ground speed for two reasons. First, while grain loss is to some degree a function of ground speed, it is more closely related to other machine settings such concave setting, rotor/cylinder speed, fan speed and sieves opening. Only after changes to these setting fail to reduce grain loss should the ground speed be adjusted in response to grain loss. Second, response to grain loss is reactive, with a 10-15 second delay between the time the crop is cut to the time the loss of that crop is detected. Other prior art system, besides grain loss, exist but they too are reactive. The present invention is positioned in front of the harvester and the crop conditions are detected 1-2 seconds prior to being cut, and therefore the control is proactive rather than reactive.

Single pendulum systems have been used at the front of the combine harvester or forage harvester to measure biomass height. The system usually consists of a simple frame having a hinge, a potentiometer, a hanging rod, and a deflector. The hinge securely holds the hanging rod to the frame, while allowing the rod to rotate. The potentiometer is connected to detect the angle of rotation between the frame and the rod. Finally the deflector is attached to the end of the rod, and deflects off biomass, allowing the height of the biomass to be determined given the angle of deflection read by the potentiometer. Although a single pendulum system can be applied to biomass other than grain, it can only determine biomass height and not other factors such biomass density and entanglement.

There are many factors affecting the harvesting of the biomass such as moisture content, varying density of biomass, the height of the biomass, the general quality of the biomass, and biomass entanglement. None of the prior art systems are able to detect and properly account for all of these factors while being applicable to a broad range of biomass such as grain, corn, or switchgrass. A method for the real time determination of biomass height, density, and entanglement is needed to determine the most efficient harvester speed.

SUMMARY OF THE INVENTION

The invention relates to a complex pendulum system biomass sensor comprising a plurality of pendulums, one or more frames, and a control system. The plurality of pendulums are connected to the one or more frames and passed through a biomass. As the pendulums are passed through the biomass, each pendulum is deflected, at a unique height, by the biomass. The amount of deflection of each pendulum is detected and passed to the control system, which calculates the height, and density of the biomass. Additionally, an entanglement sensor may also be passed through the biomass to detect biomass entanglement.

DETAILED DESCRIPTION OF THE INVENTION

The invention relates to a complex pendulum system biomass sensor comprising a plurality of pendulums, one or more frames, and a control system. The plurality of pendulums are connected to the one or more frames and passed through a biomass. As the pendulums are passed through the biomass, each pendulum is deflected, at a unique height, by the biomass. The amount of deflection of each pendulum is detected and passed to the control system, which calculates the height, and density of the biomass. Additionally, an entanglement sensor may also be passed through the biomass to detect biomass entanglement.

Figure 1A:
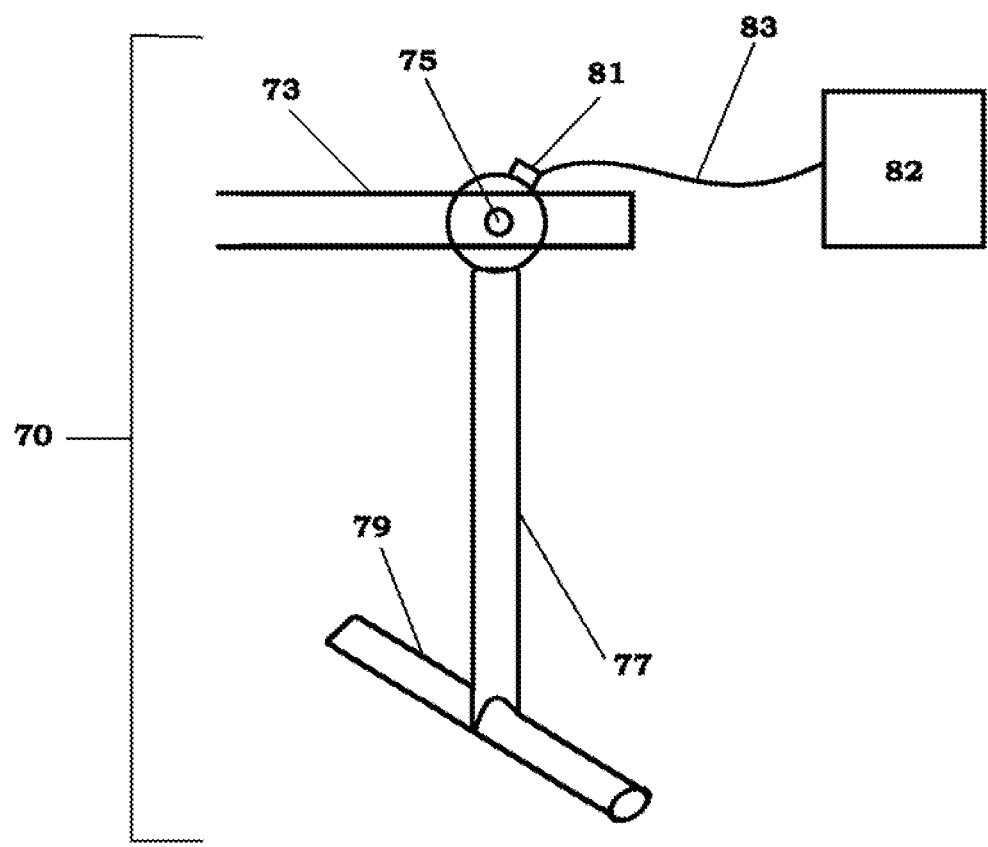
FIG. 1a depicts a side view of a preferred embodiment of a pendulum.

Each pendulum 70, as shown in FIG. 1a, comprises a hinge 75, a rod 77, a deflector 79, and an angular deflection sensor 81. The rod 77 is attached to one or more frames 73 by the hinge 75 whereby the hinge 75 allows the rod 77 to freely rotate along a free axis, which is perpendicular to the length of the rod 77. The deflector 79 is attached to the rod 77. The deflector 79 is passed through a biomass in a direction along the free axis. The angle of deflection of the rod 77 by the biomass is detected by the angular deflection sensor 81 and fed into a control system 82, preferably by one or more wires 83. The angle of deflection is the amount the pendulum rotates about the free axis when passed through the biomass. The deflector 79 of each pendulum 70 is at a unique height in relation to the ground, preferably by the use of different rod 77 lengths, different frame heights or shapes, by mounting the deflector 79 at different points along the rod 77, or combinations thereof. In a preferred embodiment, the deflector 79 is mounted at the end of the rod 77 of each pendulum, and the rod 77 of each pendulum has a unique length. Preferably, a long pendulum has a height whereby the pendulum is as low to the ground as possible without being obstructed by deviations along the ground; a short pendulum has a height whereby the pendulum generally brushes about the top of the biomass; and the remaining pendulums equally occupy the area between the long and short pendulums. As an example, in the case of a two foot grain biomass, the short pendulum hangs about two feet from the ground. A medium pendulum hangs about one foot from the ground. The long pendulum hangs about two to four inches from the ground, preferably three inches.

The one or more frames 73 are each made out of any rigid material including wood, plastics, metals, ceramics, etc. Each pendulum may share a common frame, have separate frames, use an existing rigid body, or a combination thereof. The one or more frames 73 each have a shape whereby the rod 77 and the deflector 79 are allowed to freely rotate along the free axis. The pendulums preferably, share a common frame made of ½ inc. steel stock rod. In a preferred embodiment, the one or more frames 73 are welded or more preferably bolted to the head of a combine harvester, swather, or forage harvester.

The hinge 75 may be made of any rigid materials, including wood, plastics, metals, ceramics, etc., preferably a metal. The hinge 75 allows the rod 77 to freely rotate along the free axis. The hinge 75 is preferably bolted, screwed, welded, soldered, or glued to the rod 77 and a frame from the one or more frames 73.

In a preferred embodiment, the hinge 75 comprises a steel pin, and a Teflon sleeve. The steel pin is welded to the one or more frames 73, and covered by the Teflon sleeve. The end of the rod 77 has a small aperture whereby the steel pin is allowed to perpendicularly pass through the Teflon sleeve and the rod 77. A steel cap is preferably welded or screwed onto the end of the steel pin such that the Teflon sleeve and the rod 77 are prevented from sliding off the steel pin.

The rod 77 is made of any rigid materials, including wood, plastics, metals, ceramics, etc., preferably a metal. The rod 77 has a shape whereby the rod 77 will not restrict rotation along the free axis. In a preferred embodiment the rod 77 is a ¾ inc. hollow copper pipe.

The deflector 79 is connected to the rod 77 and made of any rigid materials, including wood, plastics, metals, ceramics, etc., preferably a metal. The deflector 79 has a shape such that the deflector will rotate along the free axis when the deflector is passed through biomass in a direction along the free axis. The deflector 79 is preferably bolted, screwed, welded, soldered, or glued to the rod 77. In a preferred embodiment, the deflector 79 is a hollow 1 inc. copper pipe mounted perpendicular to the rod and free axis, and soldered to the rod 77.

The deflector 79 is preferably weighted to increase its mass so that the deflector 79 will pass somewhat into the biomass and not simply atop the biomass. The preferable weight depends upon the biomass and other dampening factors of the pendulum such as resistance from the hinge 75 or the angular deflection sensor 81. In a preferred embodiment, various lengths of steel rod are added to the inside of the deflector 79, a hollow copper pipe. In the alternative, the pendulum is designed with other types of dampening methods such as a spring integrated into the hinge 75. Preferably, the amount of dampening is adjustable by the user, such as a tension adjustment, or the ability to add and remove weights to the deflector 79. In a preferred embodiment, a 1.3 lb, 6 inc. long, 1 inc. diameter steel bar is placed inside the deflector 79 of the short pendulum 3 and the medium pendulum 5, while a 2.7 lb, 12 inc. long, 1 inc. diameter steel bar is placed inside the deflector 79 of the long pendulum 7.

In the alternative, the deflector 79 may be omitted using just the rod 77 as the deflector 79. In yet another embodiment, the deflector 79 is integrated with the rod 77 as one continuous piece.

The angular deflection sensor 81 detects the angle of rotation of the rod 77 along the free axis when passed through the biomass. Preferably, the angular deflection sensor 81 is an angle sensor capable of detecting the angle of rotation along the free axis. In a preferred embodiment, the angular deflection sensor 81 is a 340 degree rotary potentiometer. The potentiometer is connected to the one or more frames 73, and the rod 77. The resistance across the potentiometer is then measured and used to determine the angle between the one or more frames 73 and the rod 77 based on the characteristics of the potentiometer. In a preferred embodiment, the angular deflection sensor 81 comprises a potentiometer connected to a voltage divider where the output is a percentage of the input voltage and proportional to the angular displacement as expressed by the following Eq.1

$$V\text{out} = \text{angle}/\text{range} * V\text{in}. \tag{Eq. 1}$$

Where Vout is the output voltage, angle is the angle the potentiometer is at, range is the range of the potentiometer in the same unit as the angle, and Vin is the input voltage to the voltage divider. For example, where the range for the potentiometer used is 340 degrees, and 5 volts is supplied (Vin) at 0 degrees the output voltage would be 0 Volts and at 340 degrees the output would be 5 volts. Preferably, the difference between the angle when passed through the biomass, and when the pendulums are free standing is used by the control system 82 to calculate the biomass height, and density.

The control system 82 uses the output of the angular deflection sensor 81 to determine the biomass height, and density either as a relative value or as an absolute value. The control system 82 may be the operator, a mechanical device, electronic device or a combination thereof. Preferably, the control system 82 is an electronic device. The control system 82 may display an output to the operator for operator adjustment, dynamically control the speed at which the pendulums are passed through the biomass, or combinations thereof. In a preferred embodiment, the control system 82 is a microcontroller capable of controlling the speed at which the pendulums are passed through the biomass, while also displaying to the operator information on the relative height and density of the biomass. A series of lights, CRT, or LCD, for example, may be used to display information to the operator. There are many methods of controlling the speed at which the pendulums are passed through the biomass known to one skilled in the art. For example, if the pendulums are passed through a biomass by an internal combustion combine harvester, swather, or forage harvester, the speed may be controlled by a servo or vacuum actuator connected to the throttle line of the combine harvester, swather, or forage harvester.

The control system 82 receives data from the angular deflection sensor 81 of each pendulum. For example, when the angular deflection sensor 81 is a potentiometer a voltmeter is used to determine the resistance across the potentiometer. This resistance is then used with the characteristics of the potentiometer to determine the angle between the one or more frames 73 and the rod 77. The difference between this angle and the angle formed when the pendulums 70 is free standing is the angle of deflection. In a preferred embodiment, two wires measure a voltage across the angular deflection sensor 81. In another preferred embodiment, each angular deflection sensor 81 is connected via a wire to a Controller Area Network (CAN). Other wired and wireless techniques of transferring data may also be used such as digital transmission through a wire, radio frequency transmission, infrared and light transmission, and sound transmission.

The control system 82 may also be coupled with multiple sensors. For example a GPS system may be used to map biomass density and height or for automation with a system such as described in U.S. Pat. No. 6,445,983. Preferably, a Controller Area Network (CAN) is used to send readings from the angular deflection sensor 81 of each pendulum as well as any other sensor readings to the microcontroller.

The control system 82 then determines if the speed at which each pendulum 70 is passed through the biomass should be increased or decreased, A general decrease in the deflection of all pendulums, results from shorter biomass, and the control system 82 will signal for an increase the speed. A general increase in the deflection of all pendulums, results from taller biomass, and the control system 82 will signal for a decrease the speed.

A longer pendulum having a larger increase in deflection than a shorter pendulum, indicates shorter but denser biomass, and the control system 82 will signal for a decrease in speed. A longer pendulum having a larger decrease in deflection than a shorter pendulum, indicates taller but less denser biomass, and the control system 82 will preferably maintain its speed.

A shorter pendulum having a larger increase in deflection than a longer pendulum, indicates taller but less dense biomass, and the control system 82 will signal for an increase in speed. A shorter pendulum having a larger decrease in deflection than a longer pendulum, indicates shorter but more dense biomass, and the control system 82 will preferably maintain its speed. In the alternative, the control system 82 may calculate the optimal speed for harvesting, or automatically alter the speed at which the pendulums are passed through the biomass.

Figure 1B:
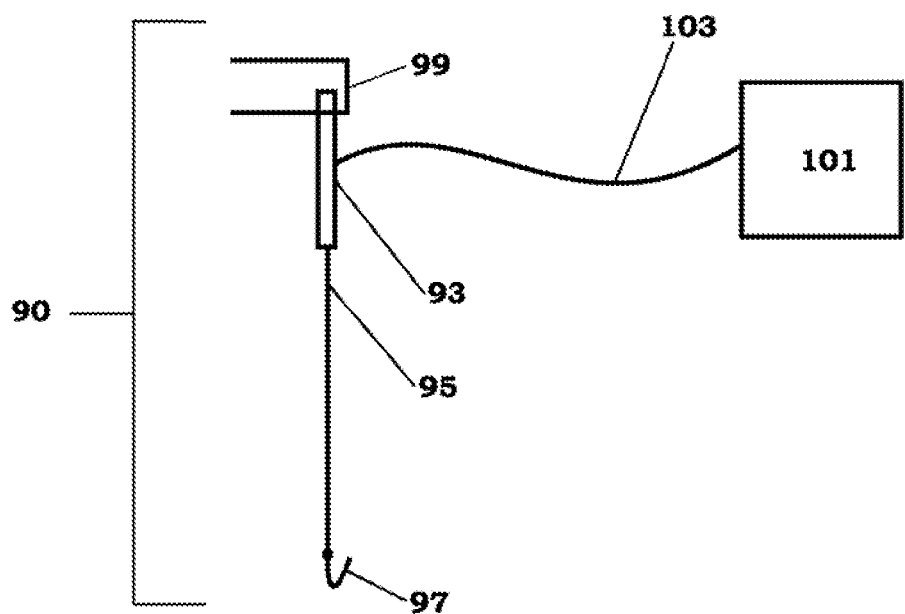
FIG. 1b depicts a side view of a preferred embodiment of an entanglement sensor.

One or more entanglement sensors and a control system may be used to detect biomass entanglement. The entanglement sensors may be completely separate and distinct from the pendulum system, or may be combined with the pendulum system as in a preferred embodiment. As shown in FIG. 1*b*, each entanglement sensor 90 has a strain sensor 93, and a hook 97. The strain sensor 93 is secured to a frame 99, preferably the frame of a pendulum. The strain sensor 93 is secured to the frame 99 preferably by welding the strain sensor 93 to the frame 99. The hook 97 is connected to the strain sensor 93 by linkage 95, preferably by a string, rope, metal twine, cable or more preferably, a steel rod.

In a preferred embodiment, the hook 97, and strain sensor 93 each have a threaded coupler. The ends of the linkage 95 are threaded, and connected to the threaded coupler of the hook 97, or the threaded coupler of the strain sensor 93.

The frame 99 can made out of any rigid material including wood, plastics, metals, ceramics, etc. Preferably, the frame 99 is made out of a metal. Each entanglement sensor 90 may have its own separate and distinct frame, or share a common frame. In the alternative, an existing rigid body may be utilized as a frame, such as a frame of a pendulum, or the head of a combine harvester. In a preferred embodiment, the frame 99 is the same frame used by the pendulums, and made of ½ inc. steel stock rod.

The strain sensor 93 is capable of measuring the force exerted by the entanglement sensor 90, preferably a strain gauge. The strain sensor 93 is fixedly connected to the hook 97 by the linkage 95. The hook 97 is also attached to the strain sensor 93 in a manner whereby the force exerted by the hook 97 may be measured by the strain sensor 93. Preferably, the strain sensor 93 is a load cell, more preferably a 10 lb. load cell.

The hook 97 is made of any rigid materials, including wood, plastics, metals, ceramics, etc., preferably a metal. The hook 97 has a shape such that when passed through the biomass it will be more likely to get caught within entangled biomass, preferably a single hook. The tip of the hook is passed along the free axis, It is analogous to passing a comb through hair. Although the comb with receive some resistance when passing through untangled hair, it will be much less than the resistance from entangled hair. Therefore, the hook 97 will pass through normal untangled biomass with relatively little resistance. However, when entangled biomass is present, the hook 97 with snag on the biomass causing an increased strain on the strain sensor 93, frame 99, and connections thereof. This increased strain is measured by the strain sensor 93 and transmitted to a control system 101, preferably by a wire 103.

Data from the strain sensor 93 is then used to determine the entanglement of the biomass by a control system 101. The control system 101 detects the amount of force exerted on the strain sensor 93, and signals for a change in the speed at which the pendulums are passed through the biomass. If the entanglement sensor 90 detects an increase in force, there is a signal to decrease the speed. If the entanglement sensor detects a decrease in force there is a signal for an increase in speed. In the alternative, the control system 101 automatically adjusts the speed.

Crop entanglement, the resulting change in speed the strain sensor is passed through the biomass, the calculated highest speed of efficiency, or combinations thereof can be calculated by the operator, a mechanical device, an electronic device, or combinations thereof. The speed may be displayed to the operator of the combine harvester, swather, or forage harvester, or fed into the control system 101 to automatically adjust the speed optimal efficiency. Ideally, strain sensor data is fed into the control system 101 with the angular deflection sensor of each pendulum whereby the control system 101 can account for biomass height, mass and entanglement.

Multiple entanglement sensors may be used producing multiple entanglement readings. In one embodiment, the entanglement sensors may be spread out over the length of the harvester to gather a more complete sample of the biomass. In this embodiment, an average entanglement reading may be calculated from the multiple entanglement sensors. In the alternative, the readings from the multiple entanglement sensors may each be stored for high resolution capture of biomass entanglement. In another embodiment, multiple entanglement sensors are used as a redundancy. In this embodiment, the readings of the entanglement sensors may be averaged, or the operator may select a single entanglement sensor reading to be utilized. Numerous other uses are known in the art, or obvious to those skilled in the art.

Figure 2:
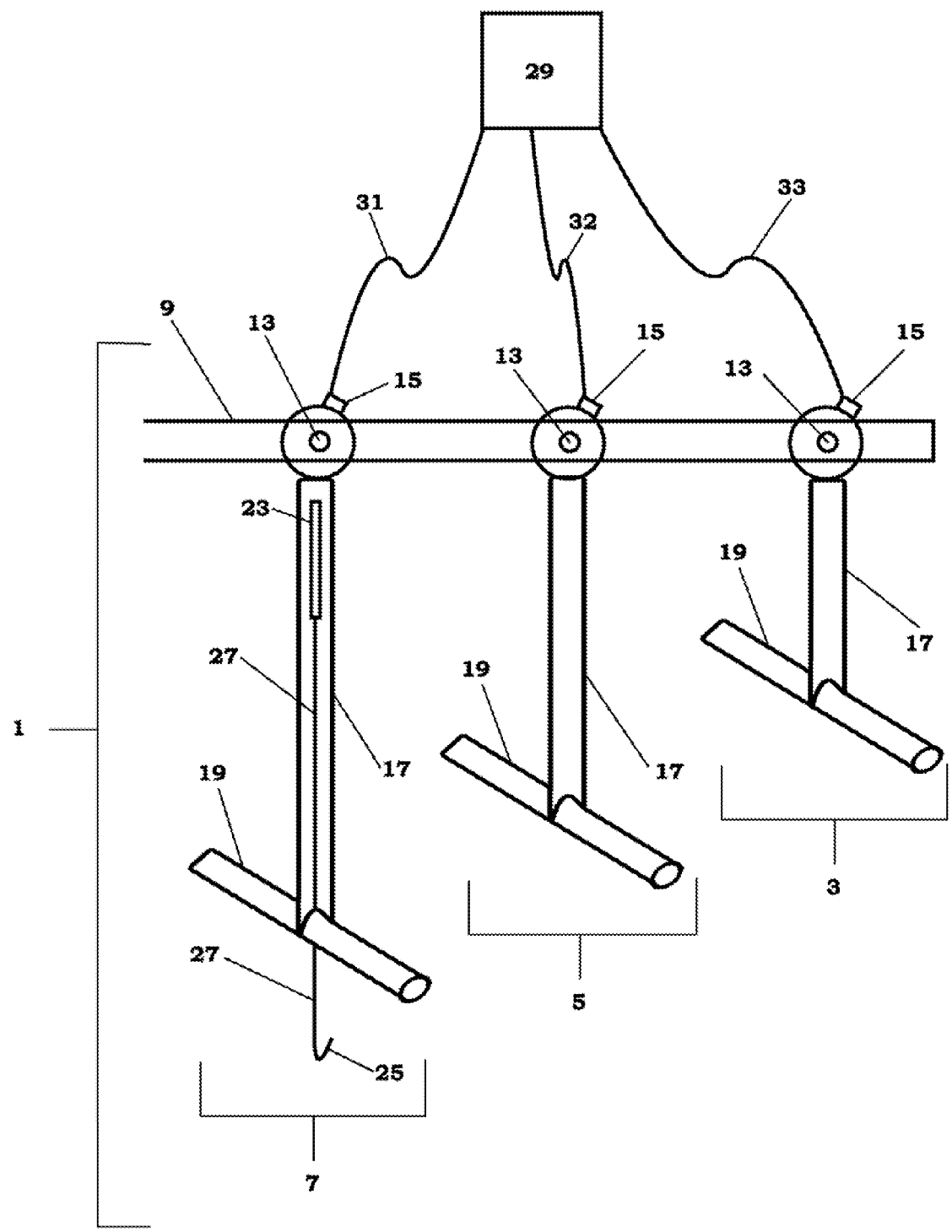
FIG. 2 depicts a side view of a preferred embodiment of a complex pendulum system biomass sensor utilizing three pendulums and an entanglement sensor.

In a preferred embodiment 1, shown in FIG. 2, short 3, medium 5, and long 7 pendulums are attached to a frame 9. The short 3, medium 5, and long 7 pendulums each have a hinge 13, angular deflection sensor 15, rod 17, and deflector 19. The rod 17 is a hollow ¾ inc. copper pipe having an aperture at one end rigidly attached to the hinge 13. The hinge 13 is a steel pin covered by a Teflon sleeve. The aperture of the rod is placed over the Teflon sleeve allowing the rod 17 to rotate along an axis perpendicular to the length of the rod 17, the free axis. The deflector 19 is a 1 inc. copper pipe soldered to the bottom of the rod 17. The deflector 19 is connected to the rod 17 so as to be perpendicular to the rod 17 and the free axis. The angular deflection sensor 15 is a rotary potentiometer rigidly attached to the rod 17 and the frame 9. Each angular deflection sensor 15 of the short 3, medium 5, and long 7 pendulums is connected to a control system 29 by a first wire 31, a second wire 32, and a third wire 33 respectively.

In a preferred embodiment, the frame 9 is made out of a ½ inc. metal stock rod, which is rigidly attached to the front of a harvester. Preferably, the short pendulum 3 hangs from the ground at about ¾ the height of the biomass, the medium pendulum 5 hangs from the ground at about ½ the height of the biomass, and the long pendulum 7 hangs from the ground at about ¼ the height of the biomass. As an example, two foot grain biomass is harvested whereby the short pendulum 3 hangs about 18 inches the ground. The medium pendulum 5 hangs about 12 inches from the ground. The long pendulum 7 hangs about 6 inches from the ground, preferably three inches.

The long pendulum 7 has an entanglement sensor having a strain sensor 23, and a hook 25. The strain sensor 23, a 10 lb. load cell, is welded to the same frame 9 as used for the pendulums. The strain sensor 23 and hook 25 each have threaded couplings. A carbon steel rod 27 is passed through the inside of the rod 17 of the long pendulum 7. The carbon steel rod 27 is threaded on each end. The strain sensor 23, and hook 25 are each attached to an end of the carbon steel rod 27 by the threaded couplings. An aperture is made through the deflector 19 of the long pendulum 7 to allow the carbon steel rod 27 to pass completely through the pendulum along a straight line. The hook 25, a single hook, is attached to the end of the carbon steel rod 27. The carbon steel rod 27 is constrained within the rod 17 and deflector 19 of the long pendulum 7, except for the carbon steel rod 27 left outside of the tong pendulum 7. The carbon steel rod 27 has a length whereby the hook 25 hangs about two inches from the long pendulum 7.

The pendulums and the entanglement sensor are then passed along the biomass, grain, in the direction on the free axis. Information from each angular deflection sensor 15 and strain sensor 23 is passed to the control system 101, which will optimize the speed at which the pendulums pass through the biomass, and display the relative biomass height, mass, and entanglement to the operator.

The angular deflection sensor 15 of each pendulum is a rotary potentiometer, more specifically 340 degree rotary potentiometer having a 5 volt voltage divider. The electrical resistance of the potentiometer changes with the angle along the following Eq. 2

$$V\text{out}=\text{angle}/340*5 \tag{Eq. 2}$$

Therefore, as the angle between the frame and the rod passes from 0 to 340 degrees the voltage increases linearly from 0 to 5 volts.

Figure 3:
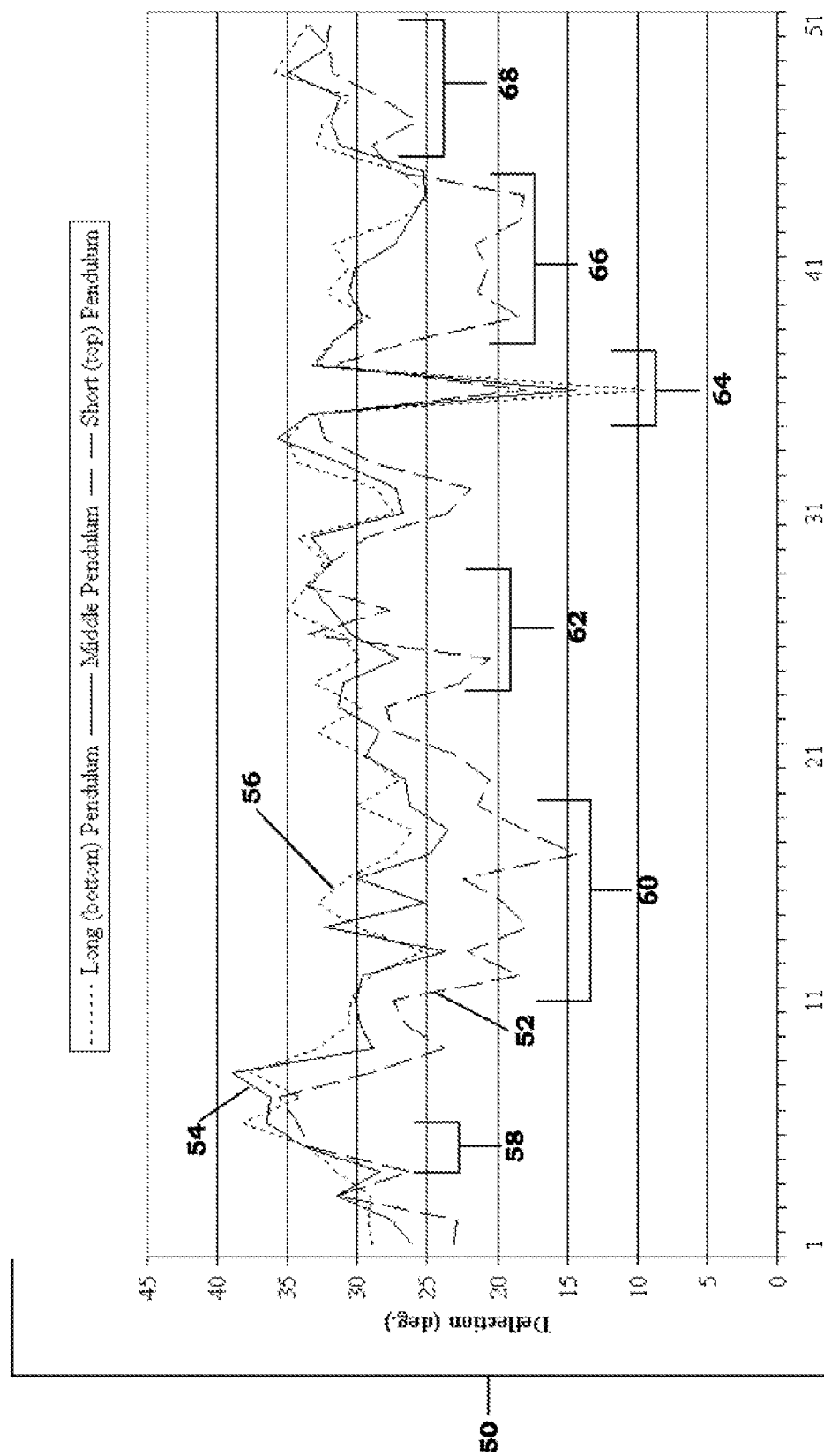
FIG. 3 shows an example output of a preferred three pendulum complex pendulum system biomass sensor.

FIG. 3 shows a sample output 50 of a preferred embodiment 1, shown in FIG. 2, as it is passed through grain. FIG. 3 was constructed from data captured by a computer from the angular deflection sensor 15 of each pendulum. The deflection angle of the first pendulum 3, second pendulum 5, and third pendulum 7, shown in FIG. 2, are shown respectively in FIG. 3 as the first pendulum reading 52, second pendulum 54, and third pendulum 56.

The first section 58 of the sample output 58, shows the first pendulum reading 52, second pendulum reading 54, and third pendulum reading 56 for the case of the biomass sensor as it moves into a grain biomass. As shown, each pendulum reading progressively increases in deflection in an approximately uniform fashion. Fluctuations in deflection can generally be attributed to grain deviation, and the fact that the shorter first pendulum 3 will respond to a change in height and density before the second pendulum 5 and third pendulum 7. Likewise, the second pendulum 5 will respond to a change in height, density before the third pendulum 7. These fluctuations are caused by the longer pendulums when deflected extending out to biomass further than the biomass detected by the shorter pendulum. In this section, the control system would preferably determine that the speed the pendulums pass through the grain should be decreased.

The second section 60 of the sample output 50 shows the readings from the pendulums as they pass through progressively shorter denser grain as shown by the greater decrease in deflection by the first pendulum reading 52 compared to the relatively constant second pendulum reading 54, and third pendulum reading 56. The decrease in the deflection of the first pendulum reading 52 indicates a shorter grain height. While the lack of relative change in deflection of the second pendulum reading 54 and third pendulum reading 56 indicate the shorter grain is denser, than the previous grain. In this section, the control system would preferably determine that the speed the pendulums pass through the grain should be decreased.

The third section 62 of the sample output 50, shows the readings from the pendulums as they pass through progressively taller, less dense grain, as shown by the overall increase in deflection by the first pendulum reading 52 and the overall constant second pendulum reading 54, and third pendulum reading 56. The increase in the overall deflection of the first pendulum reading 52 indicates a higher grain height. While the lack of overall change in deflection of the second pendulum reading 54 and third pendulum reading 56 indicate the higher grain is denser than the previous grain. In this section, the control system would preferably determine that the speed the pendulums pass through the grain should be increased. In the alternative, since the grain height has decreased, the control system may also maintain the current speed.

The fourth section 64 of the sample output 50, shows the readings from the pendulums as they pass through an empty pocket of grain, as shown by the overall decrease in deflection by the first pendulum reading 52, second pendulum reading 54, and third pendulum reading 56. In this section, the control system would preferably determine that the speed the pendulums pass through the grain should be increased.

The fifth section 66 of the sample output 50 shows the readings from the pendulums as they pass into shorter grain, as shown by the dramatic decrease in deflection by the first pendulum reading 52 and the slower decrease in the second pendulum reading 54, and third pendulum reading 56. The decrease in the overall deflection of the first pendulum reading 52, along with the relative slower change in deflection of the second pendulum reading 54 and third pendulum reading 56 indicates a shorter grain than the previous grain. In this section, the control system would preferably determine that the speed the pendulums pass through the grain should be increased.

The sixth section 68 of the sample output 50 shows the readings from the pendulums as they pass through progressively taller, less dense grain. The increase in the overall deflection of the first pendulum reading 52 indicates a higher grain height. While the lack of relative change in deflection of the second pendulum reading 54 and third pendulum reading 56, indicate that the taller grain is less dense than the previous grain. In this section, the control system would preferably determine that the speed the pendulums pass through the grain should be increased.

The control system may use multiple algorithms as known in the art. For example, the control system 82 may establish a reference point, whereby machine settings are optimally adjusted for an average angular deflection of each pendulum 70 and if the average angular deflection of a pendulum 70 changes more than a predefined threshold value the control system 82 will signal for the appropriate response. The control system 82 may also monitor the rate of change of the angular deflection of each pendulum 70 to determine the appropriate control system 82 response. In yet another embodiment, the control system 82 may assign weighting factors to the angular deflection of each pendulum 70 so that more preference is given to one angular deflection reading than another, Other methods as known by those skilled in the art may also be used.

In another embodiment, the plurality of pendulums are replaced with a plurality of flexible rods or wands that are made out of metal, fiberglass, plastic, etc. and passed through the biomass. The flexible rods or wands are positioned to pass perpendicularly through the biomass. Each flexible rod or wand has a strain gauge used to detect deflection of the flexible rod or wand as it passes through the biomass. Each strain gauge is in communication with the control system. The control system in this embodiment is capable of determining the biomass height and density using similar methods as with the pendulums above, except utilizing the actual bending of the flexible rods or wands instead of the rotation of the pendulums.

Preferably, a long flexible rod or wand has a height whereby the flexible rod or wand is as low to the ground as possible without being obstructed by deviations along the ground; a short flexible rod or wand has a height whereby the flexible rod or wand generally brushes about the top of the biomass; and the remaining flexible rods or wands equally occupy the area between the long and short flexible rods or wands. Preferably, a long flexible rod or wand, a medium flexible rod or wand, and a short flexible rod or wand are passed through the biomass. As an example, in the case of a two foot grain biomass, the short flexible rod or wand hangs about two feet from the ground. A medium flexible rod or wand hangs about one foot from the ground. The long flexible rod or wand hangs about two to four inches from the ground, preferably three inches.

Figure 4:
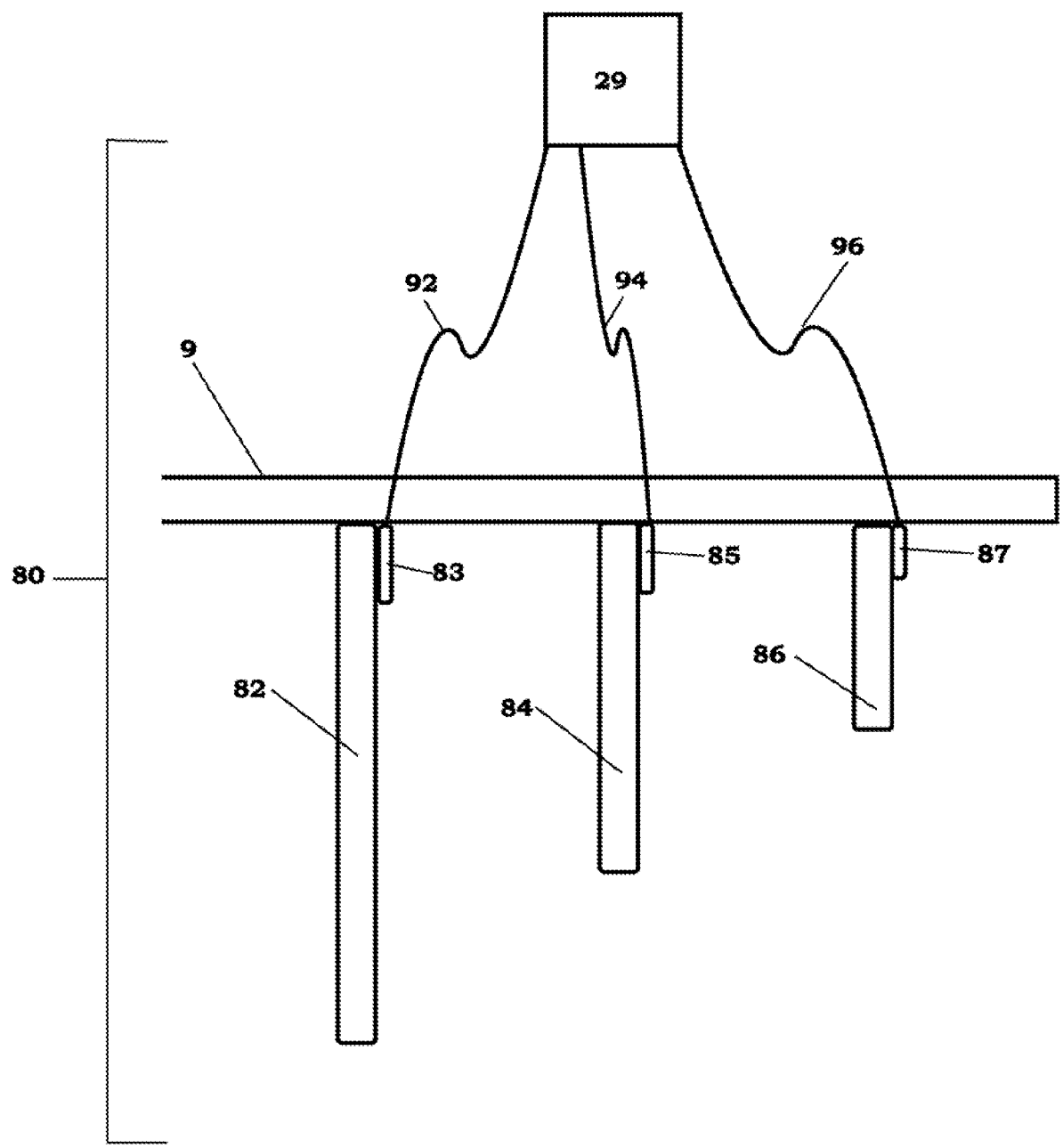
FIG. 4 shows an embodiment employing long flexible rods or wands.

In the preferred embodiment using flexible rods or wands 80 shown in FIG. 4, a long flexible rod or wand 82, a medium flexible rod or wand 84 and a short flexible rod or wand 86 are passed through the biomass. In the preferred embodiment, the rods or wands (82, 84, and 86) are positioned horizontally to pass perpendicularly through the biomass and parallel to the ground. In another embodiment, each rod or wand (82, 84, and 86) may include a deflector (similar to the deflector 79 in FIG. 1a) and be positioned vertically to pass through the biomass perpendicular to the ground. Each of the rods or wands (82, 84, and 86) are directly coupled to the frame 9 and each strain gauge (83, 85, and 87) is attached to its corresponding rod or wand (82, 84, and 86). In an alternative embodiment, each of the rods or wands (82, 84, and 86) are coupled by a corresponding strain gauge (83, 85, and 87) to the frame 9. Each strain gauge (83, 85, and 87) is in communication with the control system 29, preferably by one or more wires (92, 94, and 96). Each strain gauge (83, 85, and 87) is a device sensitive to twisting or flexing. Preferably, each strain gauge (83, 85, and 87) is a foil-type strain gauge that is glued to the surface of the rods or wands (82, 84, and 86) near its coupled end, and that it will be protected by a durable cover such as a sleeve or coating applied over the strain gage and rod or wand. The foil-type strain gauge consists of a grid of wire filament (a resistor) bonded directly to the strained surface by a thin layer of epoxy resin. When a load is applied to the surface, the resulting change in surface length is communicated to the resistor and the corresponding strain is measured in terms of the electrical resistance of the foil wire, which varies linearly with strain. Using the known characteristics of the rods or wands (82, 84, and 86) and strain gauges (83, 85, and 87) the control system can determine biomass height, and density as described above.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C. § 112, ¶6.

In particular, the use of "step of" in the claims herein is not intended to invoke the provisions of 35 U.S.C. § 112, ¶6.

What is claimed is:

1. A biomass height and density system comprising:
   a means for sensing biomass height and density, and a control system;
   said means for sensing biomass height and density has a means for communicating to said control system;
   said control system having a means for calculating said biomass height and said density;
   whereby said means for sensing biomass height and density comprises one or more frames and a plurality of pendulums;
   each pendulum comprising a hinge, a rod, and an angular deflection sensor whereby:
   said hinge is attached to a frame from said one or more frames;
   said rod has a length;
       said rod is attached to said hinge whereby said rod is freely rotatable along a free axis creating an angle between said attached frame and said rod;
   said free axis is perpendicular to said length of said rod;
   said angular deflection sensor has a means for measuring said angle between said attached frame and said rod; and
   said angular deflection sensor has a means for communicating to said control system; and
   each said rod has a size and shape whereby each said rod is deflected from said biomass at a height unique from any other rod.

2. The biomass height and density system of claim 1 whereby said rod of each pendulum has a length unique from any other rod.

3. The biomass height and density system of claim 1 whereby each pendulum further comprises a deflector fixedly attached to said rod.

4. The biomass height and density system of claim 3 whereby said deflector is attached to said rod at a location unique from any other pendulum from said plurality of pendulums.

5. The biomass height and density system of claim 3 further comprising a means for dampening said deflector.

6. The biomass height and density system of claim 1 whereby said plurality of pendulums is three pendulums.

7. The biomass height and density system of claim 1 whereby said one or more frames is a single frame whereby each pendulum is attached to said single frame.

8. The biomass height and density system of claim 1 whereby said one or more frames is a plurality of connected frames.

9. The biomass height and density system of claim 1 whereby at least one hinge comprises a metal pin and a Teflon sleeve.

10. The biomass height and density system of claim 1 whereby at least one angular deflection sensor is a rotary potentiometer.

11. The biomass height and density system of claim 1 further comprising a GPS system in communication with said control system.

12. The biomass height and density system of claim 1 further comprising:
   a combine harvester, swather, or forage harvester; and
   said means for sensing biomass height and density connected to said combine harvester, swather, or forage harvester.

13. The biomass height and density system of claim 12 whereby said control system has a means for controlling the speed of said combine harvester, swather, or forage harvester in response to said calculated biomass height and density.

14. The biomass height and density system of claim 12 whereby said control system has a means for displaying an indication of said height and said density.

15. The biomass height and density system of claim 1 whereby said means for sensing biomass height and density comprises:
   one or more frames and a plurality of flexible rods or wands and a plurality of strain gauges;
   each said rods attached to said one or more frames;
   each said strain gauge attached to a rod, whereby said strain gauge is subjected to strain from a rod;
   each said strain gauge having a means for communicating to said control system.

16. The biomass height and density system of claim 1 whereby said means for sensing biomass height and density comprises:
   one or more frames and a plurality of flexible rods or wands and a plurality of strain gauges;
   each said rod attached to said one or more frames via a strain gauge;
   each said strain gauge having a means for communicating to said control system.

17. The biomass height and density system of claim 1 further comprising:
   one or more entanglement sensors; and
   said one or more entanglement sensors each comprising a strain sensor, and a hook whereby:
   said hook is connected to said strain sensor; and
   said strain sensor is in communication with said control system.

18. The biomass height and density system of claim 17 whereby said hook is a single hook.

19. The biomass height and density system of claim 17 whereby said strain sensor is a load cell.

20. The method of measuring the entanglement of a biomass comprising the steps of:
   passing the entanglement sensor described in claim 17 through said biomass;
   detecting a force enacted on the entanglement sensor by said biomass;
   determining an entanglement value from said detected force.

21. A method of measuring biomass height and density comprising the steps of:
   providing the biomass height and density system of claim 1;
   passing said plurality of pendulums through said biomass;
   detecting the angle of deflection of each pendulum of said plurality of pendulums;
   determining the density and height of said biomass from said detected angle of deflection of each pendulum of said plurality of pendulums.

22. The method of measuring biomass height and density of claim 21 whereby said biomass is a biomass from the group of biomass consisting of grain, switchgrass, corn, forage crops, and combinations thereof.

23. The method of measuring biomass height and density of claim 21 whereby said determined density and height are absolute values.

24. The method of measuring biomass height and density of claim 21 whereby said determined density and height are relative values.

* * * * *